United States Patent
Yu et al.

(10) Patent No.: US 11,450,126 B1
(45) Date of Patent: Sep. 20, 2022

(54) SYSTEMS AND METHODS FOR AUTOMATICALLY EXTRACTING CANONICAL DATA FROM ELECTRONIC DOCUMENTS

(71) Applicant: Coupa Software Incorporated, San Mateo, CA (US)

(72) Inventors: Hongyang Yu, Chatswood (AU); Hanieh Borhanazad, Auburn (AU); Mark Oliver Burch, Warrawee (AU)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 257 days.

(21) Appl. No.: 16/835,100

(22) Filed: Mar. 30, 2020

(51) Int. Cl.
| | | |
|---|---|---|
| *G06V 30/414* | (2022.01) | |
| *G06K 9/62* | (2022.01) | |
| *G06N 20/20* | (2019.01) | |
| *G06N 3/08* | (2006.01) | |
| *G06N 3/04* | (2006.01) | |
| *G06F 17/16* | (2006.01) | |
| *G06N 7/00* | (2006.01) | |
| *G06Q 50/16* | (2012.01) | |

(52) U.S. Cl.
CPC ............ *G06V 30/414* (2022.01); *G06F 17/16* (2013.01); *G06K 9/6215* (2013.01); *G06K 9/6256* (2013.01); *G06N 3/0445* (2013.01); *G06N 3/0472* (2013.01); *G06N 3/08* (2013.01); *G06N 7/005* (2013.01); *G06N 20/20* (2019.01); *G06Q 50/167* (2013.01)

(58) Field of Classification Search
CPC .... G06V 30/414; G06F 17/16; G06K 9/6215; G06K 9/6256; G06N 3/0445; G06N 3/0472; G06N 3/08; G06N 7/005; G06N 20/20; G06Q 50/167
See application file for complete search history.

(56) References Cited

U.S. PATENT DOCUMENTS

| | | | |
|---|---|---|---|
| 2019/0138554 A1* | 5/2019 | Remis ................. | G06F 16/2237 |
| 2020/0026947 A1* | 1/2020 | Kuhlmann .......... | G06V 10/242 |
| 2020/0273078 A1* | 8/2020 | Xu ....................... | G06V 30/414 |

OTHER PUBLICATIONS

S. Tata, "Extracting Structured Data from Templatic Documents", published by Google, Inc., downloaded Jun. 12, 2020, from https://ai.googleblog.com/2020/06/extracting-structured-data-from.html, 5 pgs.

* cited by examiner

*Primary Examiner* — Jianxun Yang
(74) *Attorney, Agent, or Firm* — Baker Botts L.L.P.

(57) ABSTRACT

Described herein is a computer-implemented method for automatic extraction of canonical data from an electronic document. The method comprises classifying a first text rectangle in an electronic document as a label and a second text rectangle as a value using a first machine learning algorithm. A first probability score of a likelihood of the first text rectangle corresponding to a first canonical category is determined using a second machine learning algorithm. A second probability score of a likelihood of the second text rectangle corresponding to a first canonical category is determined using a third machine learning algorithm. A relative spatial position of the second text rectangle relative to the first text rectangle is calculated. Based on the relative spatial position, the first probability score, and the second probability score, the first text rectangle, and the second text rectangle are classified into the first canonical category.

19 Claims, 9 Drawing Sheets

SYSTEMS AND METHODS FOR AUTOMATICALLY EXTRACTING CANONICAL DATA FROM ELECTRONIC DOCUMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2016-2020 Coupa Software, Inc.

FIELD OF THE DISCLOSURE

One technical field of the disclosure is extracting data from electronic documents. Another technical field is machine-implemented interpretation of electronic documents, such as invoices. Yet another technical field is computer-implemented e-procurement systems.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Electronic documents in an e-procurement system are pervasive in any industry in modern life. In many cases, processing such documents has been performed using a single massive neural network, which often requires a lot of computing resources and a long tuning time for training the data. Using a single neural network to extract information from electronic documents also presents various challenges in understanding the semantics of texts, particularly where identifying the meaning of the texts and inferring the relationships of the texts in the electronic document.

SUMMARY

The appended claims may serve as a summary of the invention.

DETAILED DESCRIPTION

Figure 1:
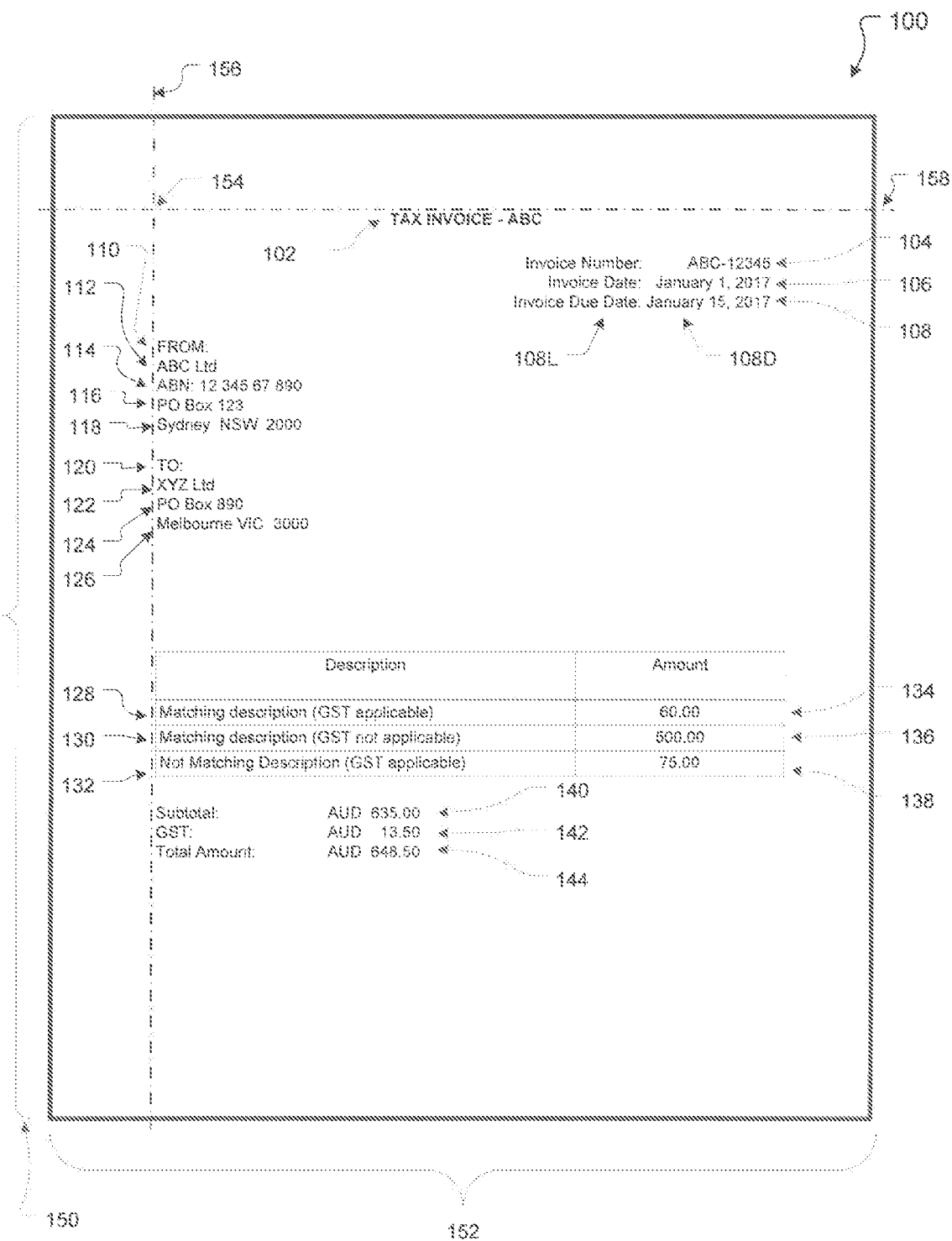
FIG. 1 illustrates an example electronic document, in particular an invoice.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Overview

The present disclosure generally relates to systems and methods for automatically extracting canonical data from electronic documents. Once canonical data has been identified from electronic documents such as invoices, it can be extracted to be used for any appropriate purpose in an e-procurement system.

In some embodiments, extracting canonical data from an electronic document is provided using an integrated neural network structure that includes fully connected neural networks. Texts in the electronic document can be classified into one of many pre-defined canonical categories using the integrated neural network structure, which has been trained to understand the meaning of a text and inferring the relationships to the nearby texts. Understanding the semantics of texts and inferring the relationship between the texts can be achieved by calculating relative spatial positions of texts with one another in the electronic document and calculating canonical probabilities of classifying texts into one of the pre-defined canonical categories. Once canonical categories are identified, the data associated with the text is automatically extracted as the identified canonical category and is used to assist in the identification and interpretation of the information from the electronic document.

The embodiments of the disclosure herein address the technical problem of training a massive single neural network, which requires a long time to tune parameters. The embodiments can help with reducing required computing resources to train, operate, and perform the automatic extraction of canonical data by breaking the single neural network structure into smaller-sized neural networks and developing the hierarchical integration of neural networks that understands text in a structured document better. Certain types of noise that may be caused during the canonical feature extraction can be progressively reduced, making training of the neural networks much easier and faster. Moreover, a neural network communicates with one another in a novel hierarchical manner in that it is trained to understand the relationship of texts and their semantics better, producing improved classification accuracy while requiring much less effort to tune and train the neural network system.

The systems and methods of the present disclosure are particularly useful for automatically identifying and extracting canonical information from invoices. Accordingly, the embodiments and features will be described with respect to that example application. The embodiments and features described herein may, however, be used to process other types of documents which are generated using templates, for example: receipts, blogs, websites, online shopping sites.

Formal requirements with respect to invoices are relatively limited. For example, while the laws of certain countries may specify that an invoice must contain certain information in order to qualify as an invoice, for example, for tax purposes, there is no standard that prescribes the exact information content of an invoice or the form in which that information content is presented. As a result of this, invoices issued by different entities will typically share some similar items of information, but may vary widely as to the manner in which those items of information are presented and as to what additional, potentially less-common, items are also presented. This wide variation in both form and content makes automatically processing invoices to accurately identify and extract relevant information difficult.

As used herein, the term "electronic document" or "document" is intended to refer to documents that are generated, stored and processed electronically and are intended to be human readable when rendered with software. Various electronic document formats are known and include, for example, documents with the following file-types/formats: .pdf; .doc; .rtf. The features and embodiments described herein may be applied to these and/or any other electronic document types. In one particular implementation, the processing described herein is performed on originally generated .pdf documents, which are ubiquitous in invoicing.

To provide context for the following description, FIG. 1 illustrates an example invoice 100. Invoice 100 includes a number of canonical features. In this context, canonical features are items of information that are relatively standard for invoices. Invoice 100 has a number of canonical features, including, for example: a title 102; an invoice number 104; an invoice issue date 106; an invoice due date 108; an issuer data header 110; an issuer name 112; an issuer business number 114; an issuer post office box 116; issuer city details 118; a recipient data header 120; recipient name 122; recipient post office box 124; recipient city details 126; first second and third line item descriptions 128, 130 and 132, with first second and third line item amounts 134, 136, 138; an invoice subtotal 140; a tax amount 142; and a total amount 144.

Canonical features may comprise both a label element and a value element, In example invoice 100, the "Invoice Due Date" canonical 108 includes both a label element 108L comprising the text "Invoice Due Date" and value element 108D of the text "Jan. 15, 2017".

Further, canonical features may be defined with differing levels of granularity. For example, in the description of invoice 100 above a relatively coarse granularity has been adopted for ease of explanation. A finer granularity may, however, be used. For example, rather than being a single canonical feature the invoice issue date may be considered three separate canonicals: invoice issue date day, invoice issue date month, and invoice issue date year.

Examples of hierarchical canonical categories are as follows:

TABLE A

| Example hierarchical canonical category | |
|---|---|
| CanonicalInvoiceFieldId | FieldName |
| 2 | InvoiceHeader-InvoiceDate |
| 3 | InvoiceHeader-InvoiceDueDate |
| 4 | InvoiceHeader-InvoiceNo |
| 5 | InvoiceHeader-SellerOrderNumber |
| 7 | InvoiceHeader-PurchaseOrderNumber |
| 10 | InvoiceHeader-DeliveryInformation-DeliveryNumber |
| 11 | InvoiceHeader-DeliveryInformation-DeliveryDate |
| 12 | InvoiceHeader-DeliveryInformation-DeliveryType |
| 13 | InvoiceHeader-DeliveryInformation-DeliveryTypeDescription |
| 16 | PartyInformation-Seller-Party-Name |
| 17 | PartyInformation-Seller-Party-GBN |
| 19 | PartyInformation-Seller-Address-AddressLine |
| 30 | PartyInformation-Buyer-Party-Name |
| 31 | PartyInformation-Buyer-Party-GBN |
| 33 | PartyInformation-Buyer-Address-AddressLine |
| 44 | PartyInformation-ShipTo-Party-Name |
| 45 | PartyInformation-ShipTo-Party-GBN |
| 47 | PartyInformation-ShipTo-Address-AddressLine |
| 56 | PartyInformation-ShipTo-Contact-Phone |
| 57 | PartyInformation-ShipTo-Contact-Fax |
| 58 | PartyInformation-ShipTo-Contact-Email |
| 61 | PartyInformation-ShipFrom-Party-Name |
| 62 | PartyInformation-ShipFrom-Party-GBN |
| 64 | PartyInformation-ShipFrom-Address-AddressLine |
| 73 | PartyInformation-ShipFrom-Contact-Phone |
| 74 | PartyInformation-ShipFrom-Contact-Fax |
| 75 | PartyInformation-ShipFrom-Contact-Email |
| 78 | PartyInformation-Payer-Party-Name |
| 79 | PartyInformation-Payer-Party-GBN |
| 81 | InvoiceAmount-TotalNetAmount-MonetaryAmount |
| 82 | InvoiceAmount-TotalNetAmount-CurrencyIsoCode |
| 83 | InvoiceAmount-TotalGSTAmount-MonetaryAmount |
| 84 | InvoiceAmount-TotalGSTAmount-CurrencyIsoCode |
| 85 | InvoiceAmount-TotalInvoiceAmount-MonetaryAmount |
| 86 | InvoiceAmount-TotalInvoiceAmount-CurrencyIsoCode |
| 87 | InvoiceAmount-TotalLevies |
| 88 | InvoiceAmount-TotalFreightIncTax |
| 89 | InvoiceAmount-TotalFreightExclTax |
| 90 | InvoiceAmount-TaxRate |
| 91 | InvoiceLines-InvoiceLine-LineNumber |

TABLE A-continued

Example hierarchical canonical category

| CanonicalInvoiceFieldId | FieldName |
|---|---|
| 93 | InvoiceLines-InvoiceLine-Product-SupplierProductId |
| 95 | InvoiceLines-InvoiceLine-Product-ItemName |
| 96 | InvoiceLines-InvoiceLine-Product-ItemDescription |
| 97 | InvoiceLines-InvoiceLine-Product-PackQty |
| 98 | InvoiceLines-InvoiceLine-Product-QtyUnitOfMeasure |
| 99 | InvoiceLines-InvoiceLine-Product-PriceUnitOfMeasure |
| 100 | InvoiceLines-InvoiceLine-Product-PriceQTY-MonetaryAmount |
| 101 | InvoiceLines-InvoiceLine-Product-PriceQTY-CurrencyIsoCode |
| 102 | InvoiceLines-InvoiceLine-Product-UnitPriceExclTax-MonetaryAmount |
| 103 | InvoiceLines-InvoiceLine-Product-UnitPriceExclTax-CurrencyIsoCode |
| 104 | InvoiceLines-InvoiceLine-Product-UnitPriceIncTax-MonetaryAmount |
| 105 | InvoiceLines-InvoiceLine-Product-UnitPriceIncTax-CurrencyIsoCode |
| 106 | InvoiceLines-InvoiceLine-Product-Comments |
| 107 | InvoiceLines-InvoiceLine-SuppliedQty |
| 108 | InvoiceLines-InvoiceLine-LineAmountExclTax-MonetaryAmount |
| 109 | InvoiceLines-InvoiceLine-LineAmountExclTax-CurrencyIsoCode |
| 110 | InvoiceLines-InvoiceLine-LineAmountIncTax-MonetaryAmount |
| 111 | InvoiceLines-InvoiceLine-LineAmountIncTax-CurrencyIsoCode |
| 112 | InvoiceLines-InvoiceLine-LineGSTAmount-MonetaryAmount |
| 113 | InvoiceLines-InvoiceLine-LineGSTAmount-CurrencyIsoCode |
| 114 | InvoiceLines-InvoiceLine-TaxCode |
| 115 | InvoiceLines-InvoiceLine-FreightValueIncTax |
| 116 | InvoiceLines-InvoiceLine-FreightValueExclTax |
| 117 | InvoiceLines-InvoiceLine-Unknown |
| 118 | InvoiceLines-InvoiceLine-LineDiscountRate |
| 119 | InvoiceLines-InvoiceLine-LineDiscountAmount |
| 120 | InvoiceLines-InvoiceLine-LineTaxRate |
| 121 | InvoiceHeader-DeliveryInformation-DeliveryDay |
| 122 | InvoiceHeader-DeliveryInformation-DeliveryInstructions |
| 123 | InvoiceLines-InvoiceLine-Product-Unit-Measure |
| 124 | InvoiceLines-InvoiceLine-Product-Unit-Name |
| 125 | InvoiceLines-InvoiceLine-Product-Unit-Size |
| 126 | InvoiceLines-InvoiceLine-Product-Package-Name |
| 127 | InvoiceLines-InvoiceLine-Product-Package-Size |
| 129 | PartyInformation-Buyer-Contact-Name |
| 130 | PartyInformation-Buyer-Contact-Phone |
| 131 | PartyInformation-Buyer-Contact-Fax |
| 132 | PartyInformation-Buyer-Contact-Email |
| 133 | PartyInformation-Buyer-SuppliersCustomerId |
| 135 | InvoiceAmount-TotalDiscountRate |
| 136 | InvoiceAmount-TotalDiscountAmount |
| 137 | InvoiceAmount-TotalDiscountDueDate |
| 138 | InvoiceAmount-TotalDiscountRate2 |
| 139 | InvoiceAmount-TotalDiscountAmount2 |
| 140 | InvoiceAmount-TotalDiscountDueDate2 |
| 141 | InvoiceAmount-TotalHandlingIncTax |
| 142 | InvoiceAmount-TotalHandlingExclTax |
| 143 | InvoiceAmount-TotalMiscIncTax |
| 144 | InvoiceAmount-TotalMiscExclTax |
| 145 | InvoiceHeader-InvoiceTime |
| 146 | InvoiceHeader-OriginalDocumentLabel |
| 147 | InvoiceHeader-PaymentTerm |
| 148 | InvoiceHeader-TaxInOriginCountryCurrency |
| 149 | InvoiceHeader-OriginCountryCode |
| 150 | InvoiceHeader-DestinationCountryCode |
| 152 | InvoiceHeader-VATProvisioningStatement |
| 153 | InvoiceHeader-BankDetails-BankName |
| 154 | InvoiceHeader-BankDetails-IBAN |
| 155 | InvoiceHeader-BankDetails-SWIFT |
| 156 | InvoiceHeader-BankDetails-BranchCode |
| 157 | InvoiceHeader-BankDetails-AccountNumber |
| 158 | InvoiceHeader-BankDetails-AccountName |
| 159 | InvoiceHeader-BankDetails-PaymentInstruction |
| 160 | InvoiceHeader-BankDetails-ReferenceNumber |
| 161 | InvoiceHeader-DeliveryInformation-DeliveryCompany |
| 162 | InvoiceHeader-Misc1 |
| 163 | InvoiceHeader-Misc2 |
| 164 | InvoiceHeader-Misc3 |
| 165 | InvoiceHeader-Misc4 |
| 167 | PartyInformation-Payee-Party-Name |
| 168 | PartyInformation-Payee-Party-GBN |
| 170 | PartyInformation-Payee-Address-AddressLine |
| 179 | PartyInformation-Payee-Contact-Phone |
| 180 | PartyInformation-Payee-Contact-Fax |
| 181 | PartyInformation-Payee-Contact-Email |
| 182 | InvoiceHeader-RemitToAddress-AddressLine |

TABLE A-continued

Example hierarchical canonical category

| CanonicalInvoiceFieldId | FieldName |
|---|---|
| 191 | InvoiceLines-InvoiceLine-OrderedQty |
| 192 | InvoiceLines-InvoiceLine-PurchaseOrderNumber |
| 193 | InvoiceLines-InvoiceLine-Date |
| 194 | InvoiceLines-InvoiceLine-Misc1 |
| 195 | InvoiceLines-InvoiceLine-Misc2 |
| 196 | InvoiceLines-InvoiceLine-Misc3 |
| 197 | InyoiceLines-lnyoiceLine-Misc4 |
| 198 | PartyInformation-Seller-Contact-Phone |
| 199 | PartyInformation-Seller-Contact-Fax |
| 200 | PartyInformation-Seller-Contact-Email |
| 201 | PartyInformation-Payer-Contact-Phone |
| 202 | PartyInformation-Payer-Contact-Fax |
| 203 | PartyInformation-Payer-Contact-Email |
| 204 | PartyInformation-Payer-Address-AddressLine |
| 213 | InyoiceAmount-TotalTax2Amount-MonetaryAmount |
| 214 | InyoiceAmount-TotalTax2Amount-CurrencyIsoCode |
| 215 | InyoiceAmount-TotalTax2Amount-Name |
| 216 | InyoiceAmount-TotalTax3Amount-MonetaryAmount |
| 217 | InyoiceAmount-TotalTax3Amount-CurrencyIsoCode |
| 218 | InyoiceAmount-TotalTax3Amount-Name |
| 219 | InyoiceAmount-TotalTax4Amount-MonetaryAmount |
| 220 | InyoiceAmount-TotalTax4Amount-CurrencyIsoCode |
| 221 | InyoiceAmount-TotalTax4Amount-Name |

Text Rectangles in an Electronic Document

Figure 2:
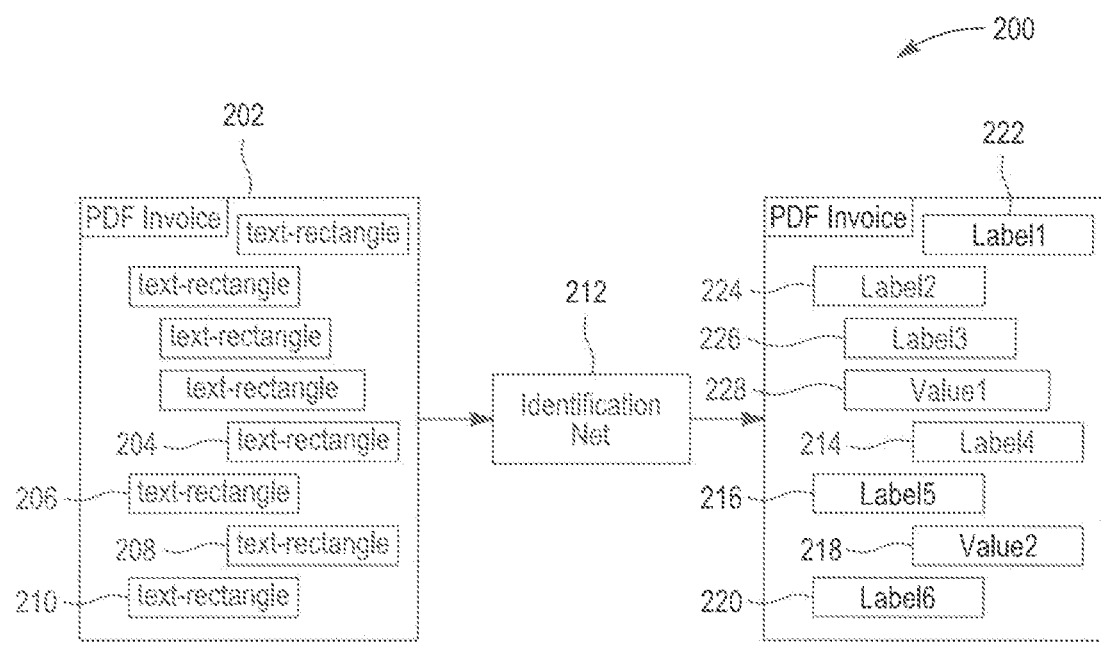
FIG. 2 depicts an example first machine learning model for classifying text rectangles into labels and values.

In an embodiment, electronic document is received at an e-procurement system. The electronic document may be divided into a plurality of text rectangles that delimit elements of the text in the electronic document, as shown in FIG. 2. Scanning techniques can be used to identify the text rectangles in which text is written. A text rectangle accommodates text, which can be either a label such as "total amount" or a value such as "648.00". Each label is associated with a corresponding canonical category and may include a counterpart value. For example, a label "Invoice Due Date" 108L can be classified as an "InvoiceDueDate" canonical category and includes a counterpart value "Jan. 15, 2017," which is also classified as the "InvoiceDueDate" canonical category.

The First Machine Learning Algorithm: Identification Net

FIG. 2 depicts an example first machine learning model 200 for classifying text rectangles 204, 206, 208, 210 into labels 214, 216, 220, 222, 224, and 226 and values 218 and 228. The first machine learning algorithm 212 is programmed to classify a text rectangle into either one of the two types: a label or a value. The first machine learning algorithm 212 may be a neural network that is programmed to understand how particular combinations of alphabets, numbers, and special characters leads to a classification of a text rectangle into either a value or a label. For example, the first machine learning algorithm 212 is programmed to classify the invoice due date 108L as a label and Jan. 15, 2017, 108D as a value. In this example, the canonical category for both label 108L and value 108D is identical. The first machine learning algorithm 212 may include an identification net.

In some embodiments, the input of the first machine learning algorithm 212 includes a case-sensitive binary encoding of the characters of the text, a normalized text rectangle position such as x-position and y-position of a text rectangle, or a normalized font or normalized font size. For example, the first thirty characters are encoded into a sparse binary vector of length of 2850. Once a matrix is obtained based on the encoded vectors, a second dimension length of the matrix is determined. The matrix may be a one-hot encoded matrix. In some cases, a zero vector padding can be added if the matrix's second dimension is less than a certain number. For example, the number could be "30" if there are less than thirty characters. If the second dimension is more than thirty, then the second dimension of the matrix is trimmed to be thirty, and the matrix is flattened to become a vector of a certain size. An example is 2850 or (95*30).

The encoded binary vector preserves both content and the ordering of the characters of a text rectangle. In one embodiment, a font-size is normalized by a maximum font size of thirty, and any text rectangle with a font size bigger than thirty is ignored. The position of a text rectangle can also be normalized by the length and width of the electronic document 202, such that values can be between 0 and 1. The final input feature vector can have 2853 features; each of its values is between 0 and 1. Such a normalization allows for the use of a higher training rate and improves the speed of convergence.

In some embodiments, the first machine learning algorithm can be a three-layer feed forward neural network with sixty-four hidden neurons. A batch normalization may be added to the hidden layer to facilitate the convergence of training.

The output of the first machine learning algorithm can be a probability of a text rectangle being a label or a value. For example, if the output of the first machine learning algorithm is 0, then it indicates that the text rectangle is a label. If the output of the first machine learning algorithm is 1, then it indicates that the text rectangle is a value. The training of the first machine learning algorithm can be achieved by minimizing the cross-entropy between the true output and the predicted output of the first machine learning algorithm by using a stochastic gradient descent algorithm that tunes the network parameters. In some embodiments, an optimization algorithm is used to train the first machine learning algorithm, and an adaptive learning rate optimizer is used with the hyperparameters that is set to default.

The Second Machine Learning Algorithm: Label Net

Figure 3:
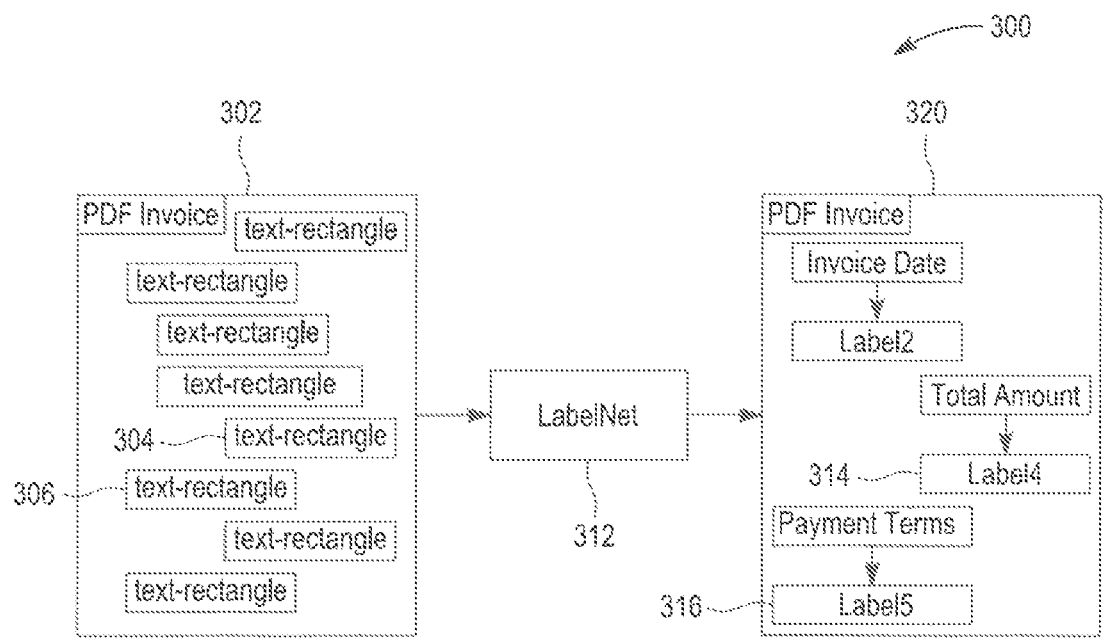
FIG. 3 depicts an example second machine learning model for classifying labels into canonical categories.

FIG. 3 depicts an example second machine learning model for classifying labels into canonical categories. In the example of FIG. 3, a machine learning model 300 is programmed for classifying labels 314, 316 into canonical categories. The second machine learning algorithm 312 is programmed to classify a label text rectangle 304, 306 into one of the pre-defined canonical categories. The second machine learning algorithm 312 may be a deep neural network that is programmed to understand the semantics of a text rectangle that is identified as a label based on its characters and a relative position in an electronic document 302. The second machine learning algorithm 312 calculates a probability score of a likelihood of a label text rectangle corresponding to a specific canonical category. In one embodiment, the output of the second machine learning algorithm 312 is a probability distribution quantifying a likelihood of a label text rectangle belonging to every one of the pre-defined canonical categories. In a related embodiment, the output of the second machine learning algorithm 312 is represented as a canonical probability vector. For example, the canonical probability vector can include a vector of values, each of which corresponds to a likelihood of a label corresponding to a respective canonical category. As an example, the canonical probability vector could have 139 values if the number of pre-defined canonical categories is 139. In one embodiment, the second machine learning algorithm 312 may include a label net.

In some embodiments, the input of the second machine learning algorithm 312 is similar to the first machine learning algorithm 212. For example, the input of the second machine learning algorithm 312 includes characters, font-size, x-position, y-position of a text rectangle. The first thirty characters may be encoded using a similar method. At this time, upper cases are converted into lower cases and are discarded in the character dictionary leaving only 69 characters rather than 95 characters.

In addition, the matrix can be used without being flattened as input to the second machine learning algorithm 312. In some embodiments, three other matrices can be generated from a one-hot encoded matrix. Each of these additional matrices is generated by multiplying the original matrix by the normalized font size, x-position, and y-position of a corresponding text rectangle, resulting in a 69×30×4 matrix.

In some embodiments, a data pre-processing procedure can further be implemented to second machine learning algorithm 312 to filter out characters that are not associated with a label.

In one embodiment, the second machine learning algorithm 312 has a network structure that uses a one-dimensional convolution operation. The one-dimensional filter acts as a sliding reader and reads characters from left to right or character by character. The network structure of the second machine learning model is detailed in Table C. Each layer operation can be followed by a batch normalization operation.

TABLE C

Example network structure for the second machine learning model

| Layer operations | Input Size | Filter Size | Filter Number | Padding | Output Size |
|---|---|---|---|---|---|
| Conv2d | 69 × 30 × 4 | 69 × 3 | 24 | VALID for dim 0 and SAME for dim 1 | 1 × 30 × 24 |
| Conv1d | 1 × 30 × 24 | 1 × 3 | 24 | AS ABOVE | 1 × 30 × 24 |
| MaxPool1d | 1 × 30 × 24 | 1 × 2 | NULL | AS ABOVE | 1 × 15 × 24 |
| Conv1d | 1 × 15 × 24 | 1 × 3 | 48 | AS ABOVE | 1 × 15 × 48 |
| Conv1d | 1 × 15 × 48 | 1 × 3 | 48 | AS ABOVE | 1 × 15 × 48 |
| MaxPool1d | 1 × 15 × 48 | 1 × 2 | NULL | AS ABOVE | 1 × 8 × 48 |
| Conv1d | 1 × 8 × 48 | 1 × 3 | 48 | AS ABOVE | 1 × 8 × 48 |
| Conv1d | 1 × 8 × 48 | 1 × 3 | 48 | AS ABOVE | 1 × 8 × 48 |
| Conv0d (networks in network) | 1 × 8 × 48 | 1 × 1 | 139 (number of output classes) | AS ABOVE | 1 × 8 139 |
| Reduction | 1 × 8 × 139 | NULL | NULL | NULL | 1 × 139 |

The training output of the second machine learning algorithm may be a one-hot encoded vector of length of 139 with a single "1" indicating the corresponding true canonical of an input text rectangle. The goal of the training is to minimize the cross-entropy between the true output and the predicted output of the second machine learning algorithm by using a stochastic gradient descent algorithm that tunes the network parameters. In some embodiments, an optimization algorithm is used to train the second machine learning algorithm, and an adaptive learning rate optimizer is used with the hyperparameters which are set to default.

In addition to the cross-entropy objective, a label smoothing objective can be added to the cost function to facilitate the grouping of similar canonical categories in the predicted output. In one embodiment, the smoothing rate is set to 0.3. Label smoothing may encourage the natural clustering of the output predictions, which can be beneficial to the fourth machine learning algorithm to allow it to easily pick out the correct output canonical category from a range of similar label categories.

The Third Machine Learning Algorithm: Value Net

Figure 4:
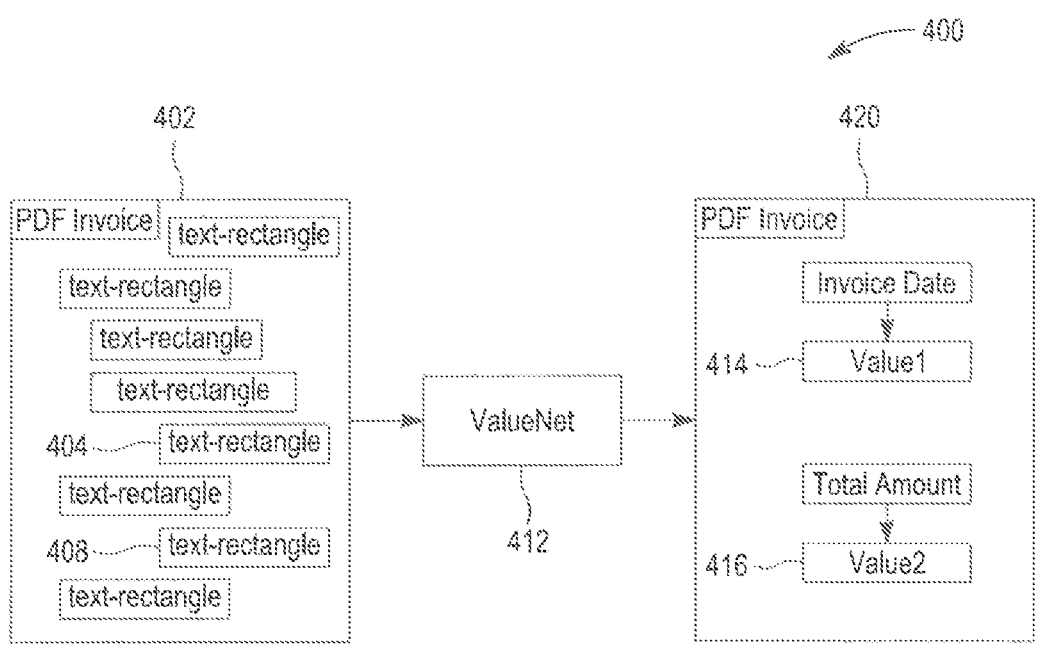
FIG. 4 depicts an example third machine learning model for classifying values into canonical categories.

FIG. 4 depicts an example third machine learning model 400 for classifying values 414, 416 into canonical categories. The third machine learning algorithm 412 can be a larger sized neural network that is trained to classify a value into one of the pre-defined canonical categories. The third machine learning algorithm 412 is programmed to understand the semantics of a text rectangle 404, 408 that is identified as a value based on their characters and relative positions in an electronic document 402. The third machine learning algorithm 412 calculates a probability score of a likelihood of a value of a text rectangle corresponding to a specific canonical category. In one embodiment, the output of the third machine learning algorithm 412 is a probability distribution quantifying a likelihood of a value text rectangle belonging to every one of the pre-defined canonicals. In a related embodiment, the output of the third machine learning algorithm 412 is represented as a canonical probability vector. For example, the canonical probability vector can include a vector of values equal in number to the number of pre-defined canonical categories, each of which corresponds to a likelihood of a value corresponding to a respective canonical category. In some embodiments, if cross entropy is used as the loss funciton to be minimized, then the values of a vector may sum up to be 1. The third machine learning algorithm 412 may include a value net.

In some embodiments, an encoding method is similar to the second machine learning algorithm 312, but a slight modification is made to the third machine learning algorithm 412. The modification includes reversing the order of characters of text rectangles. In one embodiment, for the value text rectangle, the most important and the most valued information is represented by the characters towards the end of a text. Thus, the order of characters is first reversed before the binary encoding. The modification also includes preserving the case-sensitivity of characters for the encoding procedure. Therefore, the original character dictionary of 95 characters can be used for encoding, and the resulting character matrix come out to be 95×30.

Similar to the second machine learning algorithm 312, three additional matrices can be generated respectively for each of normalized font size, x-position, and y-position and are concatenated with the original matrix. The final input to the third machine learning algorithm results in a 95×30×4 matrix. In one embodiment, the data type of values such as an "Amount," "Date," or "Address" suggested by text mining is also added to the input of the third machine learning algorithm 412 in addition to the position and the font size.

The network structure of the third machine learning model is detailed in Table D. Each layer operation can be followed by a batch normalization operation.

TABLE D

Example network structure for the third machine learning model

| Layer operations | Input Size | Filter Size | Filter Number | Padding | Output Size |
|---|---|---|---|---|---|
| Conv2d | 95 × 30 × 4 | 69 × 3 | 32 | VALID for dim 0 and SAME for dim 1 | 1 × 30 × 32 |
| Conv1d | 1 × 30 × 32 | 1 × 3 | 32 | AS ABOVE | 1 × 30 × 32 |
| MaxPool1d | 1 × 30 × 32 | 1 × 2 | NULL | AS ABOVE | 1 × 15 × 32 |
| Conv1d | 1 × 15 × 32 | 1 × 3 | 64 | AS ABOVE | 1 × 15 × 64 |
| Conv1d | 1 × 15 × 64 | 1 × 3 | 64 | AS ABOVE | 1 × 15 × 64 |
| MaxPool1d | 1 × 15 × 64 | 1 × 2 | NULL | AS ABOVE | 1 × 8 × 64 |
| Conv1d | 1 × 8 × 64 | 1 × 3 | 64 | AS ABOVE | 1 × 8 × 64 |
| Conv1d | 1 × 8 × 64 | 1 × 3 | 64 | AS ABOVE | 1 × 8 × 64 |
| Conv0d (networks in network) | 1 × 8 × 64 | 1 × 1 | 139 (number of output classes) | AS ABOVE | 1 × 8 139 |
| Reduction | 1 × 8 × 139 | NULL | NULL | NULL | 1 × 139 |

In some embodiments, the training of the third machine learning algorithm 412 is similar to the training of the second machine learning algorithm 312 except that third machine learning algorithm 412 does not include the smoothing process.

Calculating a Relative Spatial Position

Figure 6A:
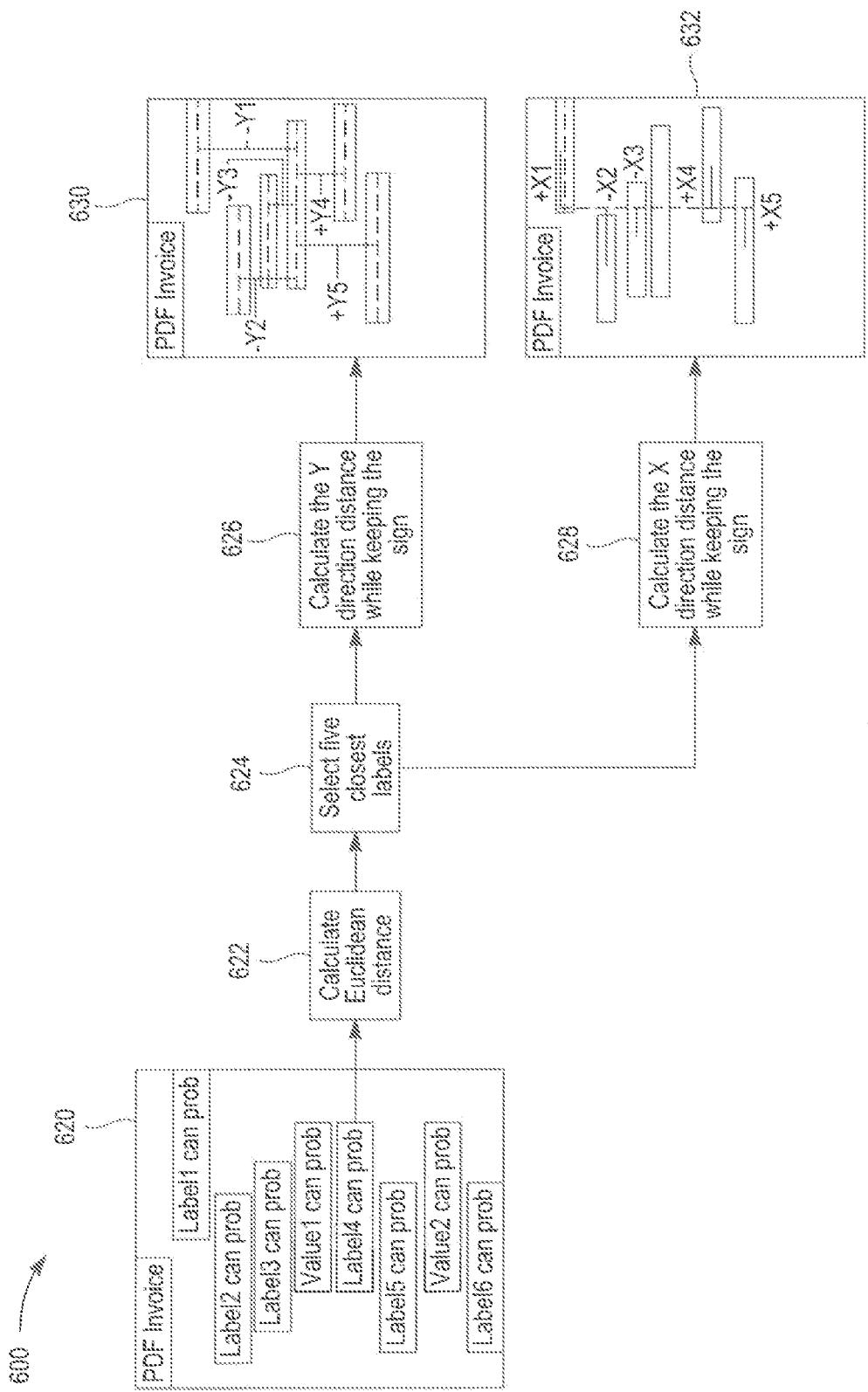
FIG. 6A and FIG. 6B illustrate a high-level process for calculating relative spatial positions of text rectangles.
Figure 6B:
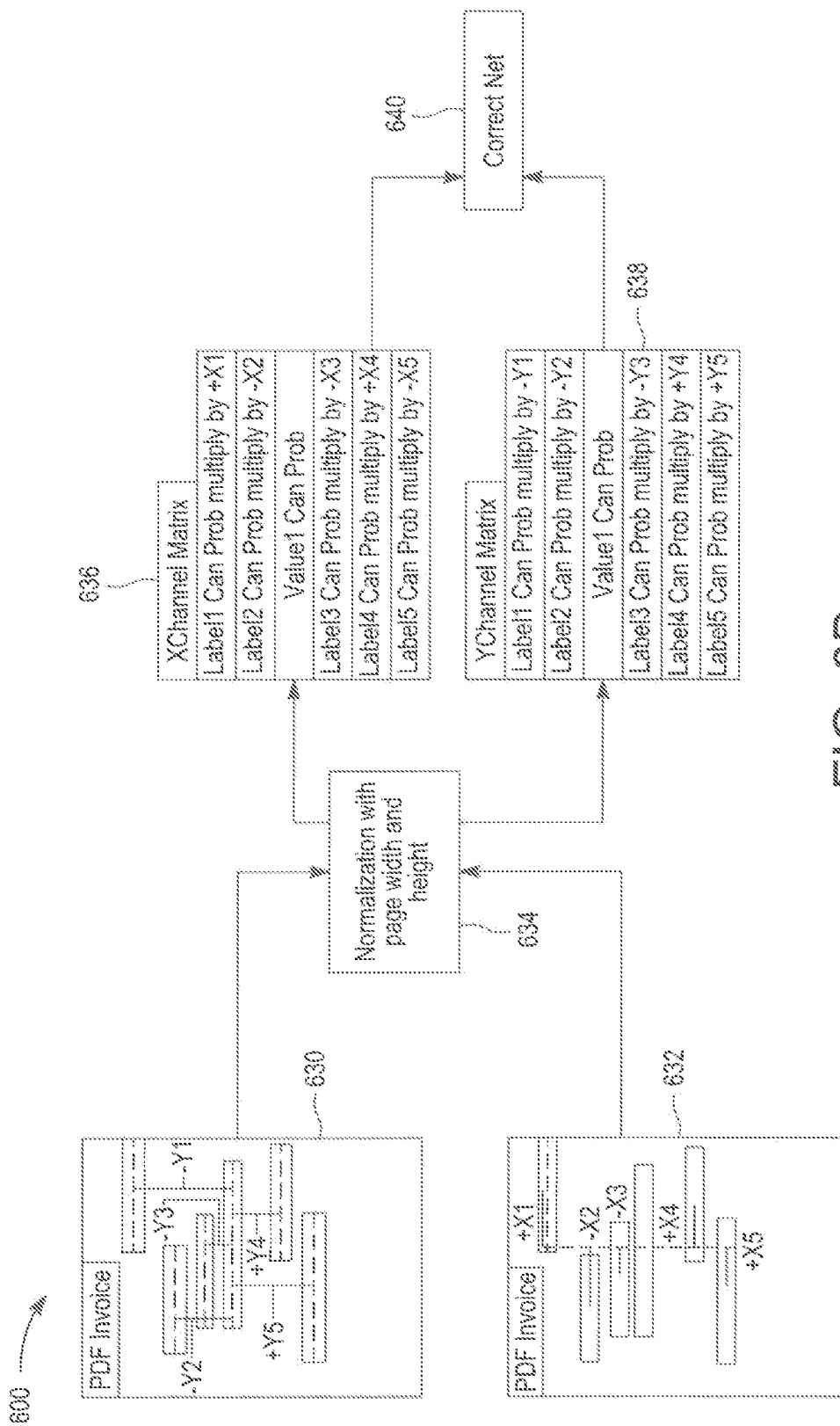

FIG. 6A and FIG. 6B illustrate a high-level process 600 for calculating a relative spatial position of a text rectangle. FIG. 6A begins with block 620. Block 620 represents an electronic document with a plurality of text rectangles where each text rectangle is identified as a label or a value using the first machine learning algorithm, and a corresponding canonical probability score is calculated using the second machine learning algorithm and the third machine learning algorithm. In some embodiments, a canonical probability score is a probability vector; each of the values in the vector indicates a likelihood of a text rectangle corresponding to a particular pre-defined canonical category. In one example, if there are 139 pre-defined canonical categories, a probability vector may include 139 values, which sums up to be 1.

At block 622, a Euclidean distance between text rectangles is calculated. For example, for each text rectangle that is identified as a value, a Euclidian distance between the value text rectangle and the nearby labels is calculated. Although a Euclidean distance was used to calculate the distance between the text rectangles, any calculation method can be used.

At block 624, based on the calculated values of the Euclidian distance, a certain number of closest labels to a specific value text rectangle is selected. In one embodiment, five closest labels are selected. In an example in FIG. 2, five closest labels to value 2 text rectangle 218 (label 2, 224, label 3 226, label 4 214, label 5 216, and label 6 220) may be selected, and label 1 222 (sixth closest label) may not be selected. In a related example, for value 2 text rectangle 218, a distance between value 1 text rectangle 228 and value 2 text rectangle 218 may not be calculated even though value 1 text rectangle 228 is closer to the value 2 text rectangle 218 than label 3 text rectangle 226 because only the label text rectangles will be selected; the value text rectangles have already been filtered out in the previous step and will be no longer in consideration for the calculating process. Although five labels are calculated for ease of explanation, any number of labels can be selected.

At block 626, for each of the five closest labels, a y-direction distance for the vertical orientation is calculated. The y-direction distance represents an orientation of a particular label text rectangle relative to the value text rectangle in a vertical orientation. As shown in block 630, if a specific label text rectangle is located below the value text rectangle, then the y-direction distance includes a "+" sign to indicate that the specific label text rectangle is located south of the value text rectangle in the electronic document. In another embodiment, if a specific label text rectangle is located above the value text rectangle, then the y-direction distance includes a "−" sign to indicate that the specific label text rectangle is located north of the vertical text rectangle in the electronic document. The "+" or "−" signs can be used interchangeably with respect to the orientation.

At block 628, for each of the five closest labels, x-direction distance is also calculated. For example, x-direction distance indicates a horizontal orientation between the selected label text rectangle and the value text rectangle. As shown in block 632, if a specific label text rectangle is located on the right side of the value text rectangle, then the y-direction distance includes a "+" sign to indicate that the specific label text rectangle is located east of the vertical text rectangle. In another embodiment, if a specific label text rectangle is located on the left side of the value text rectangle, then the x-direction distance can include a "−" sign to indicate that the specific label text rectangle is located west of the value text rectangle.

At block 634, in order to scale different sets of data, the calculated x-distance and y-distance values are normalized with a page width and a page height of an electronic document. The "+" sign and "−" sign may be maintained in the normalized values to encode the orientation information into the vectors.

In some embodiments, the calculated x-distance values and y-distance values are converted into weights. In some cases, an inverse exponential function may be applied to the calculated x-distance values and y-distance values. The inverse exponential function indicates that the closer the distance is, the more influential a specific label element is to a value element. Thus, the strength of the relationship of a label element and a value element is partially dependent on the proximity of the labels to the values. In the example of FIG. 2, label 220 is likely to be determined to be more influential to value 218 than label 226, meaning that label 220 is more likely to be paired up with value 218 than label 226. Thus, label 220 is assigned a higher weight than label 226, which is farther away from value 218. "Influential," in this context, means more closely associated with.

The spatial information such as an orientation and the weight information are encoded and stored in a memory. Such information can be used to train in the machine learning algorithms that are currently used herein.

The weights are multiplied by canonical probability vectors that have been calculated by the second and third machine learning algorithms. The orientation information "+" or "−" is kept with the weights to indicate the spatial information.

At block 636 and block 638, based on the calculated values, an x-channel matrix and a y-channel matrix are generated. A single x-channel matrix and a single y-channel matrix are generated for each value text rectangle. In the above example of the selected five closest labels and 139 pre-defined canonicals, the x-channel matrix includes a matrix of 139×6. For example, a row may include a probability vector that is a product of a corresponding weight that is converted based on the x-direction distance and a canonical probability vector calculated by the second machine learning algorithm. An x-channel matrix includes a stack of 6 vectors, which comprises probability vectors for the five closest labels and a value canonical probability vector. The vectors are stacked in the manner that the closest label vector is stacked first, and the second closest label vector is stacked second, and the value vector is followed by the other three label vectors that are farther away. Thus, the last label vector that is stacked last is the one that is farthest from the value than the other four label vectors.

A y-channel matrix is generated in a similar way as the x-channel matrix. For a y-channel matrix, y-direction distance values are used instead of x-direction distance values. A row of y-channel matrix may include a probability vector that is a product of a corresponding weight that is converted based on the y-direction distance and a canonical probability vector calculated by the second machine learning algorithm. In some embodiments, a value canonical probability in x-channel matrix and the y-channel matrix is a preliminary or original canonical score. In some cases, the preliminary canonical score can be corrected by the fourth machine learning algorithm if the preliminary canonical score incorrectly identifies a canonical category.

The Fourth Machine Learning Algorithm: Correction Net

Figure 5:
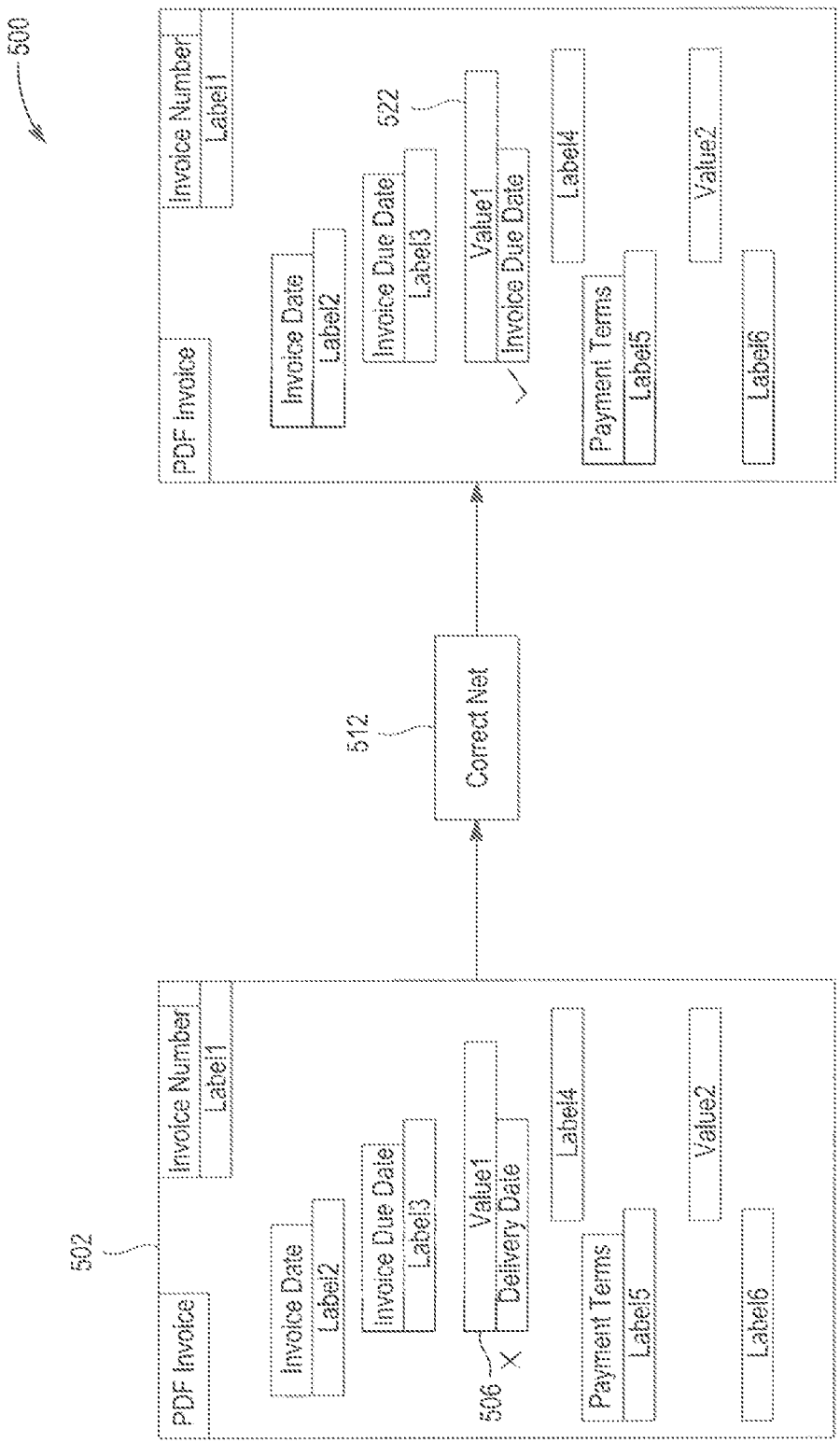
FIG. 5 depicts an example fourth machine learning model for performining canonical extraction.

FIG. 5 depicts an example fourth machine learning model 500 for determining a correct canonical extraction. Because of the high noise level contained in the canonical values calculated by the third machine learning algorithm 412, in an embodiment, the fourth machine learning algorithm 512 is programmed to filter out the noise and correct a canonical extraction from the third machine learning algorithm 412 based on the relationship between a value and its surrounding labels. Noise may exist in the canonical values due to the nature of the value element and similarity in formats. The fourth machine learning algorithm 512 may be a convolutional network which uses multiple channels of filters to examine all possible pairings of value canonicals and its nearby label canonicals to decide on the topmost likely canonical of the value. The fourth machine learning algorithm 512 can include a correct network.

If value 1 506 is incorrectly classified as a "Delivery Date" canonical category, then the fourth machine learning algorithm 512 reclassifies the value 1 506 as a correct canonical category "Invoice Due Date" 522 based on the relationship between a value and its surrounding labels. In other words, the fourth machine learning algorithm 512 is trained to understand, based on the semantics of texts and relative spatial positions of the nearby labels, which are "Invoice Due Date" 602 and an "Invoice Date" 604, that value 1 506 is more closely associated with an "Invoice Due Date" canonical category than a "Delivery Date" canonical category. For example, as shown in an example invoice in FIG. 1, the spatial position of a canonical category of "Invoice Due Date" is closely positioned with a canonical category of "Invoice Date" than a canonical category of "Delivery Date." Based on the relationships of the labels and its locations on which the fourth machine learning 512 is trained, the fourth machine learning algorithm 512 reclassifies the canonical category of value 1 506 as an "Invoice Due Date."

The network structure of the fourth machine learning model is detailed in Table E. Each layer operation can be followed by a batch normalization operation.

TABLE E

Example network structure for the fourth machine learning model

| Layer operations | Input Size | Filter Size | Filter Number | Padding | Output Size |
|---|---|---|---|---|---|
| Conv2d | 6 × 139 × 2 | 3 × 3 | 32 | VALID | 4 × 137 × 32 |
| Conv2d | 4 × 137 × 2 | 3 × 3 | 32 | VALID | 2 × 135 × 32 |
| MaxPool2d | 2 × 135 × 32 | 2 × 2 | NULL | VALID | 1 × 68 × 32 |

TABLE E-continued

Example network structure for the fourth machine learning model

| Layer operations | Input Size | Filter Size | Filter Number | Padding | Output Size |
|---|---|---|---|---|---|
| Conv1d | 2 × 68 × 32 | 1 × 3 | 64 | VALID | 1 × 66 × 64 |
| Conv1d | 1 × 66 × 32 | 1 × 3 | 64 | VALID | 1 × 64 × 64 |
| MaxPool1d | 1 × 64 × 64 | 1 × 2 | NULL | VALID | 1 × 32 × 64 |
| Conv1d | 1 × 32 × 64 | 1 × 3 | 64 | VALID | 1 × 30 × 64 |
| Conv1d | 1 × 30 × 64 | 1 × 3 | 64 | VALID | 1 × 28 × 64 |
| MaxPool1d | 1 × 28 × 64 | 1 × 2 | NULL | VALID | 1 × 14 × 64 |
| Conv0d (networks in network) | 1 × 14 × 64 | 1 × 1 | 139 (number of output classes) | VALID | 1 × 14 × 139 |
| Reduction | 1 × 14 × 139 | NULL | NULL | NULL | 1 × 139 |

In some embodiments, the loss function for the fourth machine learning algorithm can be a Binary Cross-Entropy (BCE), which treats each of the pre-defined canonical category outputs as an independent binary classification output. The BCE losses are summed for minimization using an adaptive learning rate optimizer. In this case, the hyperparameters are kept to default values. The benefit of this approach is to prevent super confidence prediction from being assigned to a single canonical category, which can be over-fitting. This effect is similar to the smoothing process, but the grouping of the output predictions is not forced as a single most accurate canonical category is what the fourth machine learning algorithm is programmed to identify, meaning that the top predicted canonical category is a correct canonical category. The output of the fourth machine learning algorithm may be a corrected canonical category or corrected value canonical probability which may be different from the preliminary original canonical value contained in the x-channel matrix or y-channel matrix. In some embodiments, the output of the fourth machine learning algorithm may include a vector of 139 corrected values corresponding to each canonical category.

Canonical Extraction

Once a text rectangle is classified into a specific canonical category, data contained within the text rectangle is automatically extracted from the associated text rectangle as the identified canonical category. In some embodiments, only the text rectangles that are identified as values are extracted. The value text rectangle may be paired up with the label text. The identified canonical category information, value data, and label data may be stored in an e-procurement system for further use.

Procedural Overview

Figure 7:
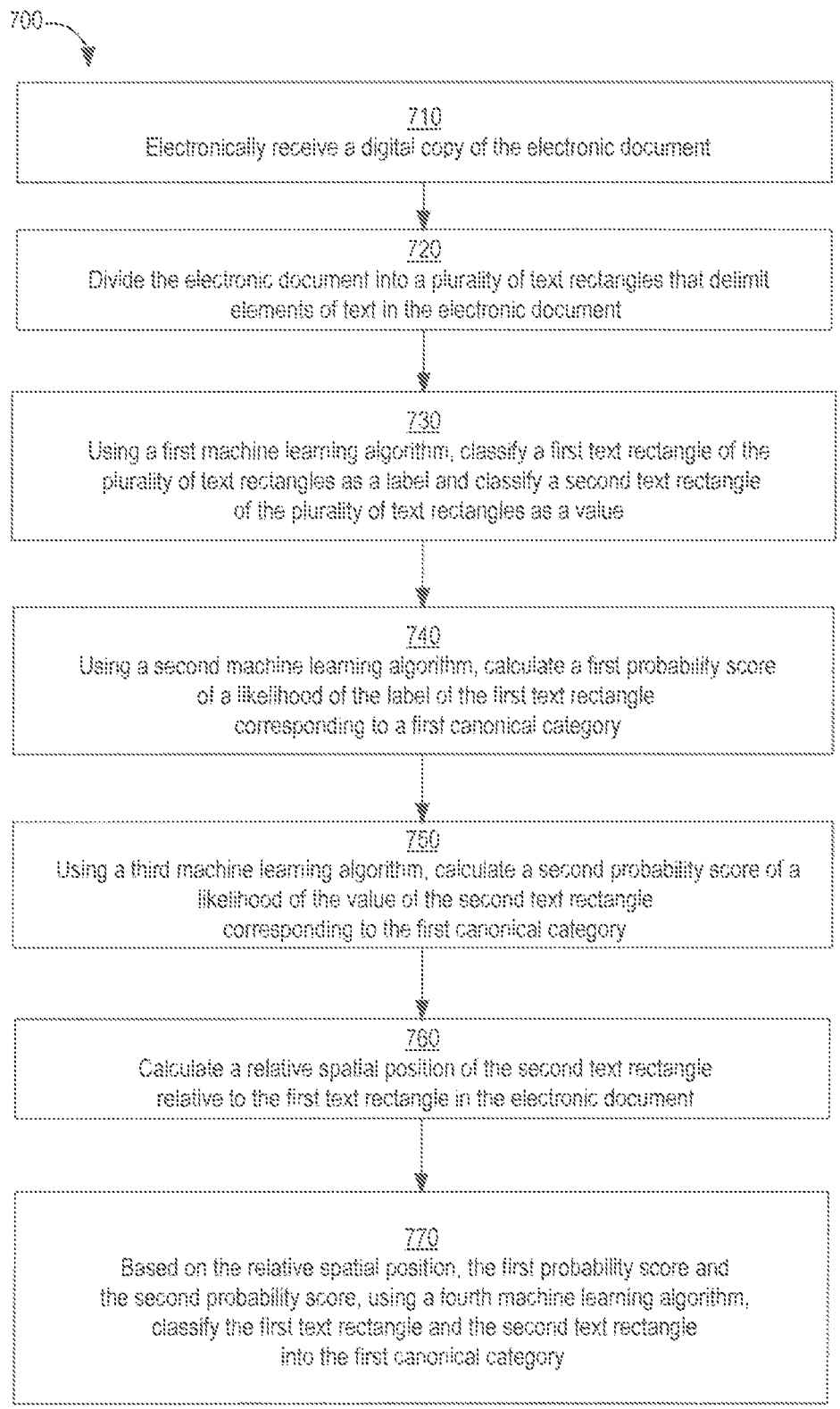
FIG. 7 illustrates a process for automatically extracting canonical data from an electronic document.

An example process 700 for doing so is described below with reference to FIG. 7. FIG. 7 illustrates a process for automatically extracting canonical data from an electronic document. FIG. 7 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the high, functional level of illustration that is normally used at the high level of skill in this art to communicate the basis of developing working programs.

The process 700 of FIG. 7 begins with step 710. At step 710, a digital copy of an electronic document is received. The electronic document can be received in various ways.

For example, the electronic document can be received in an electronic communication such as an e-mail, communication interface, or scanning or digitizing a physical document. When a digital copy of an electronic document is received, an identification of printed characters in the electronic document can be performed.

An electronic document includes a commercial document, such as an invoice. A typical invoice contains records of a transaction and information related to payment and cost of a product or service. An invoice may include a text field in the document for such information, which can be identified as a text rectangle.

At step 720, the electronic document is divided into a plurality of text rectangles. Each text rectangle includes a combination of characters, numbers, or special characters. The text rectangles are divided to delimit elements of the text in the electronic document. A text rectangle can be identified as a label or a value.

At step 730, using a first machine learning algorithm, a first text rectangle of the plurality of the text rectangles is classified as a label, and a second text rectangle of the plurality of text rectangles is classified as a value. The first machine learning algorithm is programmed to understand whether a particular text rectangle falls into a label category or a value category. The first machine learning algorithm includes an identification neural network.

At step 740, using a second machine learning algorithm, a first probability score is calculated. The first probability score indicates a likelihood of the label of the first text rectangle corresponding to a first canonical category. As shown in FIG. 2, a first probability score indicates a likelihood or canonical probability of whether a text rectangle corresponds to a specific label canonical category. The latter may comprise, for example, "Due Date" or "Invoice Date".

At step 750, using a third machine learning algorithm, a second probability score is calculated. The second probability score indicates a likelihood of the value of the second text rectangle corresponding to a first canonical category. As shown in FIG. 3, a second probability score indicates a likelihood or canonical probability of whether a text rectangle corresponds to a specific value canonical category such as "Mar. 10, 2020" or "ABC-52".

At step 760, a relative spatial position of the second text rectangle relative to the first text rectangle in the electronic document is calculated. A canonical category for a label element and value element is identical in the manner that the paired label and value are positioned closer to one another than other labels or values that are associated with a different canonical category. Step 760 of the calculating the relative spatial position is described in more detail in connection with FIG. 8.

At step 770, based on the relative spatial position, the first probability score, and the second probability score, the first text rectangle, and the second text rectangle are classified into the first canonical category, using a fourth learning algorithm. The fourth learning algorithm is a convolutional neural network that is programmed to predict a canonical category for automatic extraction of canonical data. In some embodiments, outputs of the second machine learning algorithm and the third machine learning algorithm are inputted into the fourth machine learning algorithm as a training dataset for training the fourth machine learning algorithm. Although each of the machine learning algorithms operates independently, the machine learning algorithms and structures are fully connected and intertwined with each other.

Figure 8:
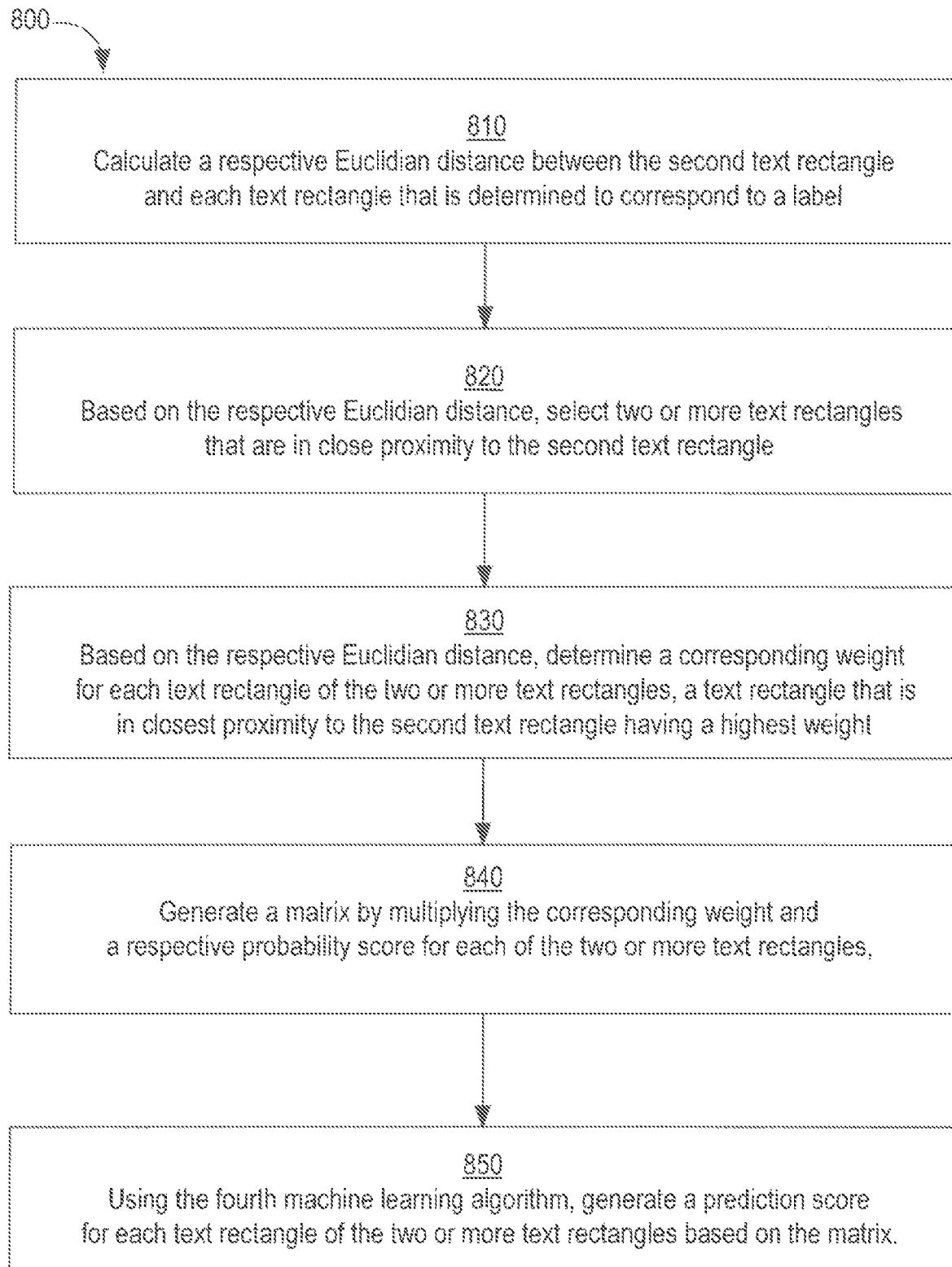
FIG. 8 illustrates a process for calculating a relative spatial position of a text rectangle according to the process of FIG. 7.

FIG. 8 illustrates a process 800 for calculating a relative spatial position of a text rectangle according to the process of FIG. 7.

At step 810, a respective Euclidean distance between the second text rectangle and each text rectangle that is identified as a label is calculated. A Euclidian distance indicates how influential a particular text rectangle that is identified as a label is to a value text rectangle in determining a corresponding canonical category. Although a Euclidean distance was used to calculate the distance between the text rectangles, any calculation method can be used.

At step 820, two or more text rectangles that are determined to correspond to labels and in close proximity to the second text rectangle are selected. In some cases, five text rectangles that are determined to correspond to labels are selected.

At step 830, based on the respective Euclidian distance, a corresponding weight for each text rectangle of the two more text rectangles is determined. Generally, a text rectangle that is in closest proximity to the second text rectangle has the highest weight.

At step 840, a matrix is generated by multiplying the corresponding weight and a respective probability score for each of the two or more text rectangles.

At step 850, using the fourth machine learning algorithm, a prediction score for each text rectangle of the two or more rectangles is generated based on the matrix. In some embodiments, a prediction score is trained using the fourth machine learning algorithm based on a set of training data, including a respective probability score. The prediction score can be a canonical probability vector that represents how likely a certain text rectangle is classified into a pre-defined canonical category. The prediction score represents the topmost likely canonical category for a value element and the topmost likely counterpart label element for the value element.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
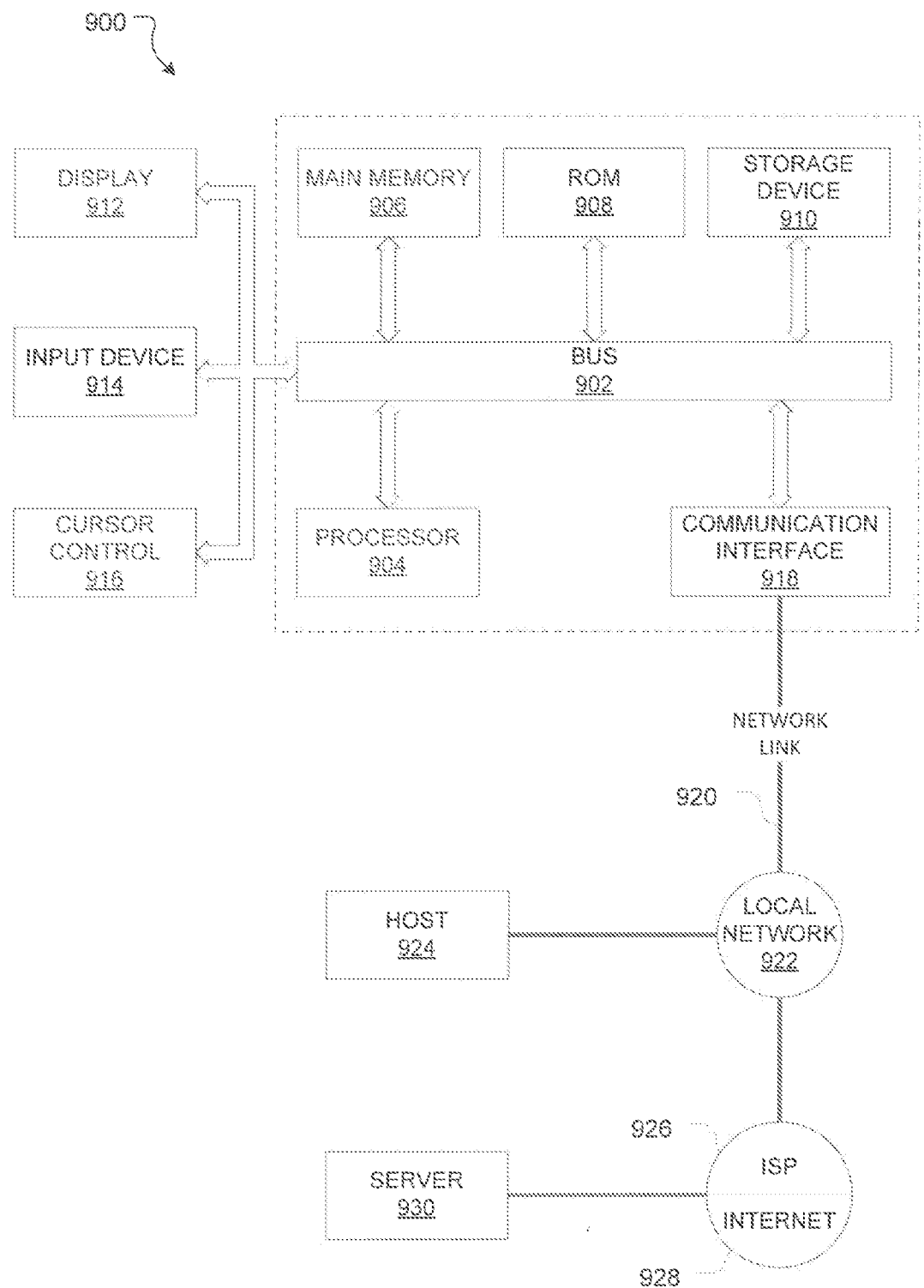
FIG. 9 illustrates a computer system which may be used to implement various features and embodiments described herein.

For example, FIG. 9 is a block diagram that illustrates a computer system 900 upon which an embodiment of the invention may be implemented. Server computer 102 and/or user computer 112 may be computer systems such as 900.

Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to one more output devices such as a display 912 for displaying information to a computer user. Display 912 may, for example, be a cathode ray tube (CRT), a liquid crystal display (LCD), a light emitting diode (LED display), or a touch screen display. An input device 914, including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (for example, x) and a second axis (for example, y), that allows the device to specify positions in a plane. Additional and/or alternative input devices are possible, for example touch screen displays.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

A computer system as described herein may be configured in a plurality of useful arrangements. In one approach, a data processing method comprises operating a computer to obtain from one or more non-transitory computer-readable data storage media a copy of one or more sequences of instructions that are stored on the media and which when executed by the computer cause the computer to perform the techniques that are described herein.

A computer system may take a variety of forms, for example a server computer, a desktop computer, a laptop computer, a notebook computer, a tablet computer, a smart phone, or other computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for automatic extraction of canonical data from an electronic document that represents an item of commercial paper in an e-procurement system, the method comprising:

electronically receiving a digital copy of the electronic document;

dividing the electronic document into a plurality of text rectangles that delimit elements of text in the electronic document;

using a first machine learning algorithm, classifying a first text rectangle of the plurality of text rectangles as a label and classifying a second text rectangle of the plurality of text rectangles as a value, including classifying each label and value into one or more canonical categories;

using a second machine learning algorithm, calculating a first probability score of a likelihood of the label of the first text rectangle corresponding to a first canonical category;

using a third machine learning algorithm, calculating a second probability score of a likelihood of the value of the second text rectangle corresponding to the first canonical category;

calculating a relative spatial position of the second text rectangle relative to the first text rectangle in the electronic document;

based on the relative spatial position, the first probability score and the second probability score, using a fourth machine learning algorithm, classifying the first text rectangle and the second text rectangle into the first canonical category, the fourth machine learning algorithm comprising a convolutional neural network that is programmed to output one or more corrected values corresponding to each canonical category, and further comprising inputting, into the fourth machine learning algorithm, outputs of the second machine learning algorithm and the third machine learning algorithm as a training dataset for training the fourth machine learning algorithm;

the fourth machine learning algorithm further comprising multiple channels of filters to examine all possible pairings of value canonicals and nearby label canonicals to determine a topmost likely canonical of a value.

2. The computer implemented method of claim 1, further comprising:

based on the classifying the first text rectangle and the second text rectangle into the first canonical category, pairing the first text rectangle with the second text rectangle;

automatically extracting data from the second text rectangle as the first canonical category.

3. The computer implemented method of claim 1, further comprising converting each of the plurality of text rectangles into a vector that encodes characters and normalizes positions and fonts of text of a corresponding one of the plurality of text rectangles.

4. The computer implemented method of claim 1, further comprising calculating the relative spatial position by calculating a Euclidian distance between the first text rectangle and the second text rectangle, the Euclidian distance indicating how influential the first text rectangle is to the second text rectangle in determining a corresponding canonical category.

5. The computer implemented method of claim 4, further comprising:

calculating a respective Euclidian distance between the second text rectangle and each text rectangle that is determined to correspond to a label;

based on the respective Euclidian distance, selecting two or more text rectangles that are in close proximity to the second text rectangle;

based on the respective Euclidian distance, determining a corresponding weight for each text rectangle of the two or more text rectangles, a text rectangle that is in closest proximity to the second text rectangle having a highest weight;

generating a matrix by multiplying the corresponding weight and a respective probability score for each of the two or more text rectangles, wherein the respective probability score is a probability vector;

using the fourth machine learning algorithm, generating a prediction score for each text rectangle of the two or more text rectangles based on the matrix.

6. The computer implemented method of claim 5, wherein the respective probability score is determined using the fourth machine learning algorithm and the prediction score is trained using the fourth machine learning algorithm based on a set of training data including the respective probability score.

7. The computer implemented method of claim 1, the fourth machine learning algorithm further comprising a Binary Cross-Entropy (BCE) loss function that is configured to treat each canonical category output as an independent binary classification output and to sum BCE losses for minimization using an adaptive learning rate optimizer.

8. A system for automatic extraction of canonical data in an electronic document, an electronic document that represents an item of commercial paper in an e-procurement system, the system comprising:

one or more processors;

one or more non-transitory computer-readable storage media storing sequences of instructions which, when executed by the one or more processors, cause the one or more processors to:

electronically receive a digital copy of the electronic document;

divide the electronic document into a plurality of text rectangles that delimit elements of text in the electronic document;

using a first machine learning algorithm, classify a first text rectangle of the plurality of text rectangles as a label and classify a second text rectangle of the plurality of text rectangles as a value, including classifying each label and value into one or more canonical categories;

using a second machine learning algorithm, calculate a first probability score of a likelihood of the label of the first text rectangle corresponding to a first canonical category;

using a third machine learning algorithm, calculate a second probability score of a likelihood of the value of the second text rectangle corresponding to the first canonical category;

calculate a relative spatial position of the second text rectangle relative to the first text rectangle in the electronic document;

based on the relative spatial position, the first probability score and the second probability score, using a fourth machine learning algorithm, classifying the first text rectangle and the second text rectangle into the first canonical category, the fourth machine learning algorithm comprising a convolutional neural network that is programmed to output one or more corrected values corresponding to each canonical category, and further comprising inputting, into the fourth machine learning algorithm, outputs of the second machine learning algorithm and the third machine learning algorithm as a training dataset for training the fourth machine learning algorithm;

the fourth machine learning algorithm further comprising multiple channels of filters to examine all possible pairings of value canonicals and nearby label canonicals to determine a topmost likely canonical of a value.

9. The system of claim 8, further comprising sequences of instructions which, when executed by the one or more processors, causes the one or more processors to:

based on the classifying the first text rectangle and the second text rectangle into the first canonical category, pair the first text rectangle with the second text rectangle;

automatically extract data from the second text rectangle as the first canonical category.

10. The system of claim 8, further causes the one or more processors to convert each of the plurality of text rectangles into a vector that encodes characters and normalizes positions and fonts of text of a corresponding one of the plurality of text rectangles.

11. The system of claim 8, further causes the one or more processors to calculate the relative spatial position by calculating a Euclidian distance between the first text rectangle and the second text rectangle, the Euclidian distance indicating how influential the first text rectangle is to the second text rectangle in determining a corresponding canonical category.

12. The system of claim 11, further causes the one or more processors to:
- calculate a respective Euclidian distance between the second text rectangle and each text rectangle that is determined to correspond to a label;
- based on the respective Euclidian distance, select two or more text rectangles that are in close proximity to the second text rectangle;
- based on the respective Euclidian distance, determine a corresponding weight for each text rectangle of the two or more text rectangles, a text rectangle that is in closest proximity to the second text rectangle having a highest weight;
- generate a matrix by multiplying the corresponding weight and a respective probability score for each of the two or more text rectangles, wherein the respective probability score is a probability vector;
- using the fourth machine learning algorithm, generate a prediction score for each text rectangle of the two or more text rectangles based on the matrix.

13. The system of claim 12, wherein the respective probability score is determined using the fourth machine learning algorithm and the prediction score is trained using the fourth machine learning algorithm based on a set of training data including the respective probability score.

14. The system of claim 8, the fourth machine learning algorithm further comprising a Binary Cross-Entropy (BCE) loss function that is configured to treat each canonical category output as an independent binary classification output and to sum BCE losses for minimization using an adaptive learning rate optimizer.

15. One or more non-transitory computer-readable media storing instructions which, when executed by one or more processors, cause:
- electronically receiving a digital copy of an electronic document;
- dividing the electronic document into a plurality of text rectangles that delimit elements of text in the electronic document;
- using a first machine learning algorithm, classifying a first text rectangle of the plurality of text rectangles as a label and classifying a second text rectangle of the plurality of text rectangles as a value, including classifying each label and value into one or more canonical categories;
- using a second machine learning algorithm, calculating a first probability score of a likelihood of the label of the first text rectangle corresponding to a first canonical category;
- using a third machine learning algorithm, calculating a second probability score of a likelihood of the value of the second text rectangle corresponding to the first canonical category;
- calculating a relative spatial position of the second text rectangle relative to the first text rectangle in the electronic document;
- based on the relative spatial position, the first probability score and the second probability score, using a fourth machine learning algorithm, classifying the first text rectangle and the second text rectangle into the first canonical category, the fourth machine learning algorithm comprising a convolutional neural network that is programmed to output one or more corrected values corresponding to each canonical category, and further comprising inputting, into the fourth machine learning algorithm, outputs of the second machine learning algorithm and the third machine learning algorithm as a training dataset for training the fourth machine learning algorithm;
- the fourth machine learning algorithm further comprising multiple channels of filters to examine all possible pairings of value canonicals and nearby label canonicals to determine a topmost likely canonical of a value.

16. The one or more non-transitory computer-readable media of claim 15, wherein the instructions further cause:
- based on the classifying the first text rectangle and the second text rectangle into the first canonical category, pairing the first text rectangle with the second text rectangle;
- automatically extracting data from the second text rectangle as the first canonical category.

17. The one or more non-transitory computer-readable media of claim 15, wherein the instructions further cause converting each of the plurality of text rectangles into a vector that encodes characters and normalizes positions and fonts of text of a corresponding one of the plurality of text rectangles.

18. The one or more non-transitory computer-readable media of claim 15, wherein the instructions further cause calculating the relative spatial position by calculating a Euclidian distance between the first text rectangle and the second text rectangle, the Euclidian distance indicating how influential the first text rectangle is to the second text rectangle in determining a corresponding canonical category.

19. The one or more non-transitory computer-readable media of claim 15, the fourth machine learning algorithm further comprising a Binary Cross-Entropy (BCE) loss function that is configured to treat each canonical category output as an independent binary classification output and to sum BCE losses for minimization using an adaptive learning rate optimizer.

* * * * *